US012645926B2

(12) United States Patent

Redondo et al.

(10) Patent No.: US 12,645,926 B2

(45) Date of Patent: Jun. 2, 2026

(54) CONDUCTANCE MAPPING TECHNIQUE FOR NEURAL NETWORKS

(71) Applicant: Arm Limited, Cambridge (GB)

(72) Inventors: Fernando García Redondo, Cambridge (GB); Mudit Bhargava, Austin, TX (US); Paul Nicholas Whatmough, Cambridge, MA (US); Shidhartha Das, Upper Cambourne (GB)

(73) Assignee: Arm Limited, Cambridge (GB)

( * ) Notice: Subject to any disclaimer, the term of this patent is extended or adjusted under 35 U.S.C. 154(b) by 1122 days.

(21) Appl. No.: 17/689,755

(22) Filed: Mar. 8, 2022

(65) Prior Publication Data

US 2023/0289576 A1 Sep. 14, 2023

(51) Int. Cl.
*G06N 3/063* (2023.01)
*G06N 3/04* (2023.01)
*G06N 3/082* (2023.01)

(52) U.S. Cl.
CPC .............. *G06N 3/063* (2013.01); *G06N 3/04* (2013.01); *G06N 3/082* (2013.01)

(58) Field of Classification Search
CPC ........... G06N 3/04; G06N 3/063; G06N 3/08; G06N 3/082; G06N 3/0454; G06N 20/10
See application file for complete search history.

(56) References Cited

U.S. PATENT DOCUMENTS

| | | | |
|---|---|---|---|
| 11,568,228 B2 * | 1/2023 | Hoang ................... | G06F 3/0604 |
| 12,307,354 B2 * | 5/2025 | Zhang ................... | G06N 3/063 |

| | | | |
|---|---|---|---|
| 2018/0075338 A1 * | 3/2018 | Gokmen ................ | G06N 3/045 |
| 2018/0165573 A1 * | 6/2018 | Hsu ....................... | G06N 3/063 |
| 2019/0164044 A1 * | 5/2019 | Song ...................... | G11C 11/54 |
| 2020/0356847 A1 * | 11/2020 | Yi ........................... | G06F 17/16 |
| 2021/0232900 A1 * | 7/2021 | Lee ......................... | G06N 3/084 |
| 2021/0397931 A1 * | 12/2021 | Hoang ................... | G06N 3/044 |
| 2022/0358354 A1 * | 11/2022 | Hoang ................... | G06N 3/09 |
| 2022/0398438 A1 * | 12/2022 | Zhang ................... | G06F 7/5235 |

(Continued)

FOREIGN PATENT DOCUMENTS

| | | | | |
|---|---|---|---|---|
| WO | WO-2019147522 A2 * | 8/2019 | .............. | G06N 3/08 |
| WO | WO-2023059265 A1 * | 4/2023 | .............. | G06N 3/049 |

OTHER PUBLICATIONS

García-Redondo, Fernando, and Marisa López-Vallejo. "Self-controlled multilevel writing architecture for fast training in neuromorphic RRAM applications." Nanotechnology 29.40 (2018): 405203. (Year: 2018).*

(Continued)

*Primary Examiner* — Randall K. Baldwin

(74) *Attorney, Agent, or Firm* — Pramudji Law Group PLLC; Ari Pramudji

(57) ABSTRACT

Various implementations described herein are directed to a device having neural network circuitry with an array of synapse cells arranged in columns and rows. The device may have input circuitry that provides voltage to the synapse cells by way of row input lines for the rows in the array. The device may have output circuitry that receives current from the synapse cells by way of column output lines for the columns in the array. Also, conductance for the synapse cells in the array may be determined based on the voltage provided by the input circuitry and the current received by the output circuitry.

19 Claims, 11 Drawing Sheets

(56) References Cited

U.S. PATENT DOCUMENTS

2022/0398439 A1\* 12/2022 Zhang ..................... G06N 3/063

OTHER PUBLICATIONS

Basu, Arindam, et al. "Low-power, adaptive neuromorphic systems: Recent progress and future directions." IEEE Journal on Emerging and Selected Topics in Circuits and Systems 8.1 (2018): 6-27. (Year: 2018).\*

Chen, Pai-Yu, Xiaochen Peng, and Shimeng Yu. "NeuroSim: A circuit-level macro model for benchmarking neuro-inspired architectures in online learning." IEEE Transactions on Computer-Aided Design of Integrated Circuits and Systems 37.12 (2018):3067-3080. (Year: 2018).\*

Chen, Bowei, et al. "Optimal tuning of memristor conductance variation in spiking neural networks for online unsupervised learning." IEEE Transactions on Electron Devices 66.6 (2019): 2844-2849. (Year: 2019).\*

Chang, H-Y., et al. "AI hardware acceleration with analog memory: Microarchitectures for low energy at high speed." IBM Journal of Research and Development 63.6 (2019): 8-1. (Year: 2019).\*

Gnawali, Krishna Prasad, et al. "Reliability enhancements in memristive neural network architectures." IEEE Transactions on Nanotechnology 18 (2019): 866-878. (Year: 2019).\*

Liao, Yan, et al. "Diagonal matrix regression layer: Training neural networks on resistive crossbars with interconnect resistance effect." IEEE Transactions on Computer-Aided Design of Integrated Circuits and Systems 40.8 (2020): 1662-1671. (Year: 2020).\*

Fumarola, Alessandro, et al. "Non-filamentary non-volatile memory elements as synapses in neuromorphic systems." 2019 19th Non-Volatile Memory Technology Symposium (NVMTS). IEEE, 2019. (Year: 2019).\*

Narayanan, Pritish, et al. "Toward on-chip acceleration of the backpropagation algorithm using nonvolatile memory." IBM Journal of Research and Development 61.4/5 (2017): 11-1. (Year: 2017).\*

Zhou, et al.; AnalogNets: ML-HW Co-Design Of Noise-Robust TinyML Models and Always-On Analog Compute-In-Memory Accelerator; arXiv, Cornell University; Nov. 2021. DOI: 10.48550/arXiv. 2111.06503.

Zhang, et al; Impact of Parasitic Wire Resistance on Accuracy and Size of Resistive Crossbars; 2021 ISCAS; Apr. 2021. DOI: 10.1109/ ISCAS51556.2021.9401279.

Chang, et al.; A 5-nm 135-Mb SRAM in EUV and High-Mobility Channel FinFET Technology With Metal Coupling and Charge-Sharing Write-Assist Circuitry Schemes for High-Density and Low-VMIN Applications; IEEE Journal of Solid-State-Circuits; vol. 56, No. 1; pp. 179-187; Jan. 2021.

García-Redondo, et al.; Training DNN IoT Applications for Deployment on Analog NVM Crossbars; arXiv, Cornell University; May 2020.

Zhou, et al.; Noisy Machines: Understanding Noisy Neural Networks and Enhancing Robustness to Analog Hardware Errors using Distillation; arXiv, Cornell University; Jan. 2020. DOI: 10.48550/ arXiv.2001.04974.

Peng, et atl.; DNN+NeuroSim: An End-to-End Benchmarking Framework for Compute-in-Memory Accelerators with Versatile Device Technologies; IEEE; Dec. 2019. DOI: 10.1109/IEDM19573.2019. 8993491.

Li, et al.; Analogue Signal and Image Processing with Large Memristor Crossbars; Nature Electronics; Dec. 2017. DOI: 10.1038/ s41928-017-0002-z.

Blackford, et al; An Updated Set of Basic Linear Algebra Subprograms (BLAS); ACM Transactions on Mathmatical Software; vol. 28, No. 2; pp. 135-151; Jun. 2002.

\* cited by examiner

100

Neural Network Circuitry 104

200

I = V x G and thus, G = I/V

V Inputs, I outputs and G matrix

400

Neural Network with 3-Terminal NVM Synapse Cells 404

500

700        Neural Network Circuitry with Crossbar Sub-Divisions 704

Activated Passgate Switches (APGS)        Activated Xbar Area 724

Conductance (G)

714

V1

DAC (Voltage Input)

L1
(SB1)

L3
(SB3)

L2
(SB2)

V3

V2

Flying Bitline (FBL)

ADC (Current Output) 718

I1

I2

I3

Flying Bitlines (FBL)

Passgate Switches (PGS) Interconnecting

Sub-Blocks Activated Passgate Switches (APGS)

800

Neural Network Circuitry with Crossbar Sub-Divisions 804

Flying Bitlines (FBL) Not Needed

Activated Xbar Area 824

▮▮▮ Flying Bitlines (FBL) Not Needed

▨▨▨ Passgate Switches (PGS) Interconnecting

▨▨▨ Sub-Blocks Activated Passgate Switches (APGS)

900

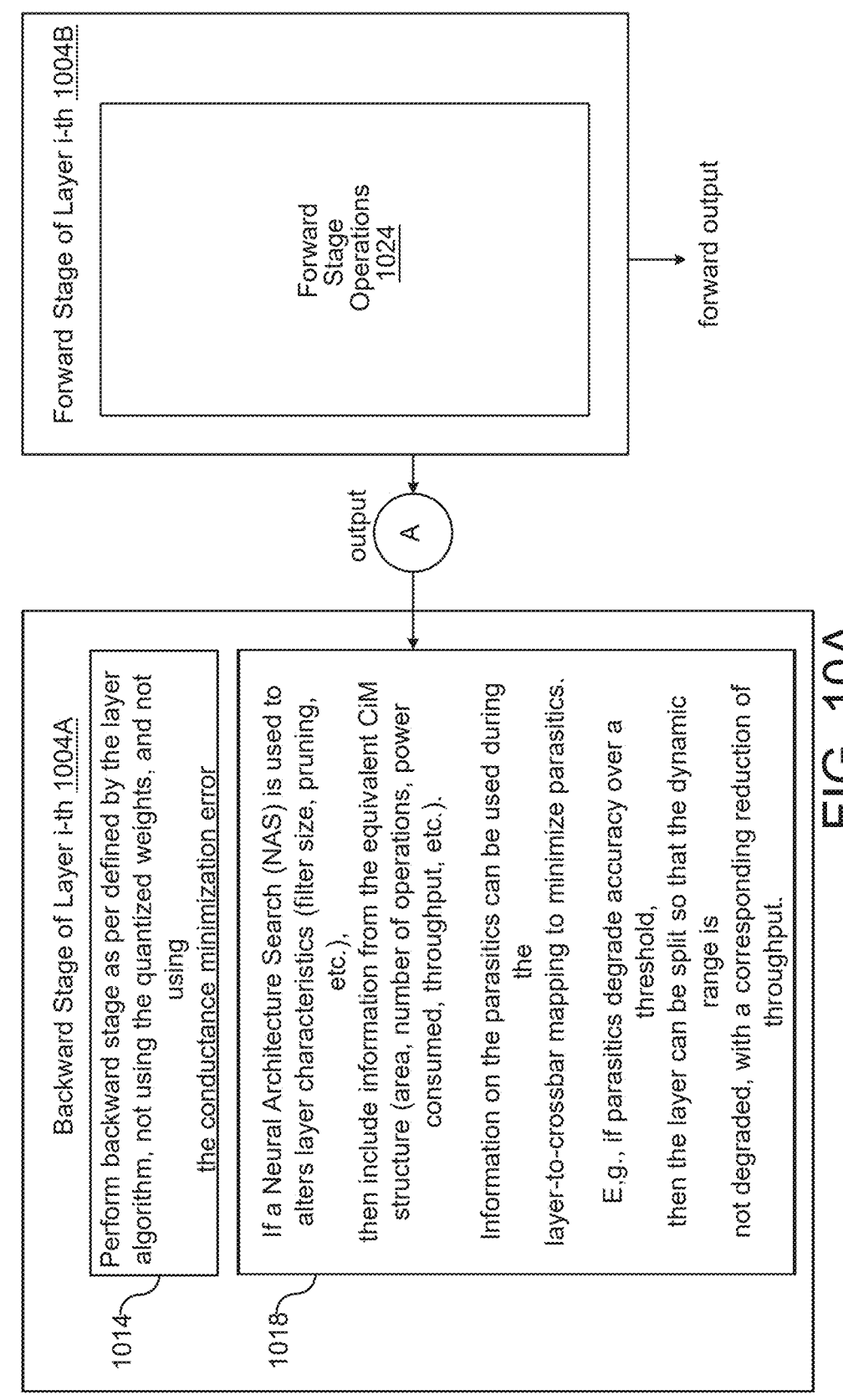

Training Operations with Forward/Backward Stages 1004

1000A

Forward Stage of Layer i-th 1004B

Forward Stage Operations 1024 forward output output

A

Backward Stage of Layer i-th 1004A

1014 — Perform backward stage as per defined by the layer algorithm, not using the quantized weights, and not using the conductance minimization error 1018 — If a Neural Architecture Search (NAS) is used to alters layer characteristics (filter size, pruning, etc.), then include information from the equivalent CiM structure (area, number of operations, power consumed, throughput, etc.).

Information on the parasitics can be used during the layer-to-crossbar mapping to minimize parasitics.

E.g., if parasitics degrade accuracy over a threshold, then the layer can be split so that the dynamic range is not degraded, with a corresponding reduction of throughput.

FIG. 10A

CONDUCTANCE MAPPING TECHNIQUE FOR NEURAL NETWORKS

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some conventional memory architecture designs, various challenges arise in machine learning with respect to scalability, such as in reference to scale-up computations for training and inference while remaining energy efficient. In recent times, some neural networks have been proposed to address scalability challenges, wherein a broad goal of neuromorphic architecture research has led to creation of neural networks for designing electronic components in a manner that takes inspiration from (or at least tries to mimic) the architecture of the human brain. This may be achieved with the desire that one would obtain considerable energy efficient advantages over some conventional neural network designs similar to the often-touted computational efficiency of the human brain. However, substantial challenges remain such as finding effective ways to train neural networks and implementing various techniques for mapping neural networks to the physical substrate, which may be resource limited and thus substantially difficult to implement.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

FIGS. 10A-10B illustrate process diagrams of methods for providing training operations for a neural network in accordance with implementations described herein.

DETAILED DESCRIPTION

Figure 1:
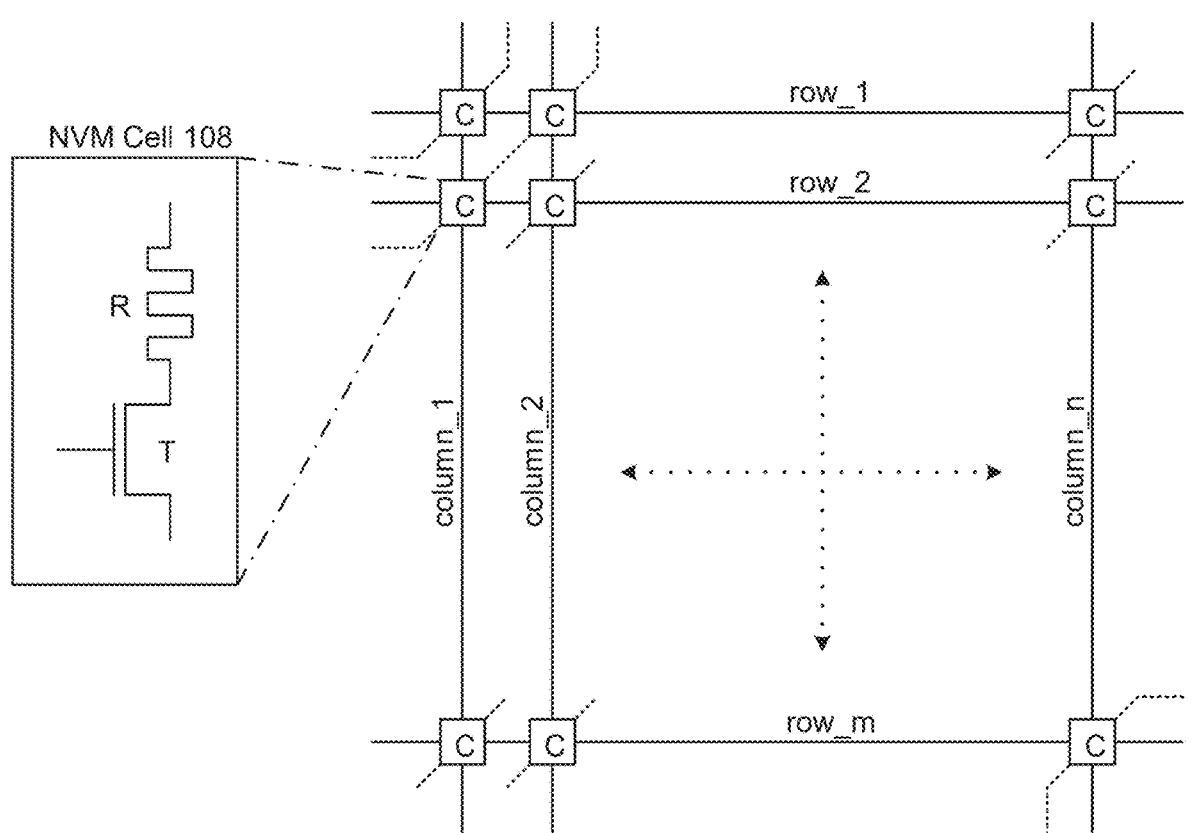
FIGS. 1-2 illustrate various schematic diagrams of neural network circuitry in accordance with various implementations described herein.

Various implementations described herein are directed to configurable neural networking schemes and techniques for energy efficient applications. For instance, the various schemes and techniques described herein may provide for energy efficient online training of spiking neural networks (SNN) using non-volatile memories (NVM), such as, e.g., resistive random access memory (RRAM), magnetic RAM (MRAM), spin-transfer-torque magnetic RAM (STT-MRAM), and correlated-electron RAM (CeRAM). Therefore, various aspects of the present disclosure may provide for performing online training using a spiking neural network (SNN) that is designed with RRAM, MRAM, STT-MRAM and/or CeRAM NVM synapse cells, in a manner as described herein.

Some benefits of neuromorphic computing may refer to the event-driven nature of computational paradigms in that there is a large amount of sparsity in neural network circuitry. In some instances, neuromorphic computing may refer to the instantiation of a computing paradigm that may enable computations on highly sparse representations, which may drive the possibility of making dense deep neural networks sparser to thereby improve energy efficiency. Thus, neural networks may be designed with sparsity from the onset, and with event-driven networks, computation may only occur where and when it is necessary and, in this manner, these computations may lead to energy efficiency benefits and thus scaling neural networks may become easier. In addition to these considerations, some neural network circuitry pursue energy efficiency advantages by performing some calculations in the analog domain, and these analog based calculations may use non-volatile memories (NVM) along with resistive intersecting crossbars.

In a spiking neural network (SNN), information is exchanged between neurons via short messages or voltage spikes with actual information content of each transmission encoded in the time of arrival or dispatch of the spike and/or the rate at which spikes are transmitted. In some approximations of a biological model, charge accumulates as spikes arrive at a neuron (e.g., when inputs of connected neurons fire). Also, this accumulation of charge may lead to a corresponding increase in voltage, which may cause a neuron to fire when the potential difference exceeds a particular voltage threshold. In some models, the accumulated charge may leak away or decay such that the neuron slowly returns to its inactive state, if and when the neuron subsequently fails to fire.

In some neural network applications, training neuromorphic hardware involves considerable effort. In reference to Spike-Timing-Dependent Plasticity (STDP), strength of the connection between neurons may be modulated based on relative timing of input and output spikes. This idea models a biological process that refers to an instantiation of a more general concept of Hebbian learning. The STDP learning rules stipulate that if an input spike arrives shortly before the output spike is generated, then the weight of the corresponding synapse is increased (potentiation). Conversely, if the input spike arrives after the output spike is generated, then weight of a corresponding synapse is decreased (depression). The degree to which each weight is adjusted may be variable, and some formulations use transfer functions for potentiation and depression.

Various implementations of neural networking schemes and techniques will be described in detail herein with reference to FIGS. 1-9 and 10A-10B.

Figure 2:
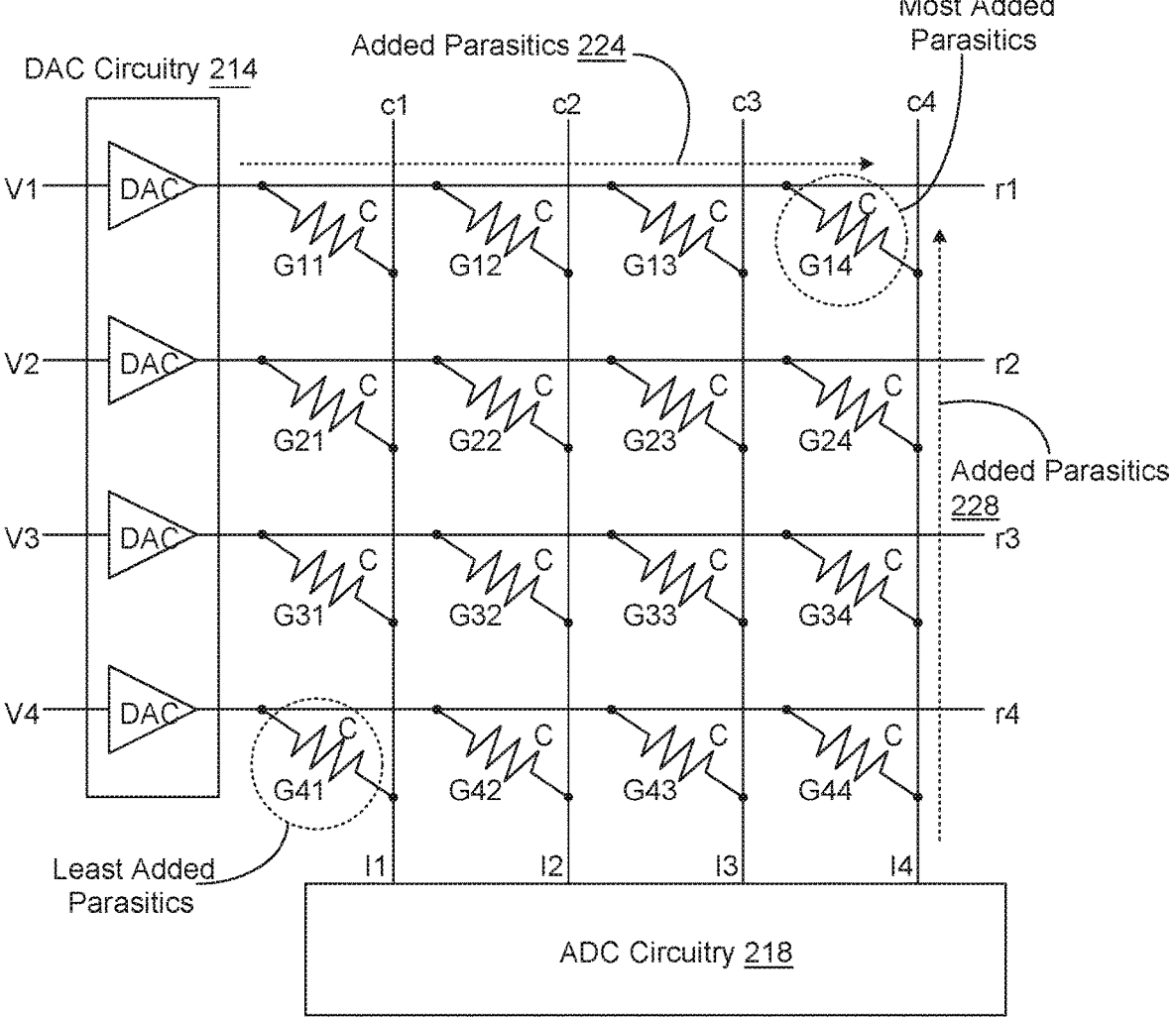

FIGS. 1-2 illustrate various schematic diagrams of neural network circuitry in accordance with various implementations described herein. In particular, FIG. 1 shows a schematic diagram 100 of neural network circuitry 104, and FIG. 2 shows a schematic diagram 200 of neural network circuitry 204.

In various implementations, the neural network circuitry 104 may refer to a system or device having various integrated circuit (IC) components that are arranged and coupled together as an assemblage or combination of parts that provide for a physical circuit design and related structures. In some instances, a method of designing, providing and building the neural network circuitry 104 as an integrated system or device that may be implemented with various IC circuit components is described herein so as to thereby implement various neural networking schemes and techniques associated therewith. The neural network circuitry 104 may be integrated with various neural network computing circuitry and related components on a single chip, and the neural network circuitry 104 may be implemented in various embedded systems for automotive, electronic, mobile and Internet-of-things (IoT) applications, including remote sensor nodes.

As shown in FIG. 1, the neural network circuitry 104 refers to neural network architecture having an array of synapse cells (C) that are arranged in columns (column_1, column_2, . . . , column_n) and rows row_1, row_2, . . . , row_m). In some implementations, the synapse cells (C) are accessible with a column control voltage via the columns and with a row control voltage via the rows. The memory circuitry 104 may receive the column control voltage and the row control voltage as input, and also, the memory circuitry 104 may provide a corresponding output. The memory circuitry 104 may be adapted to record neural network training profile data to determine an extent to which various connections between neurons are adjusted. The synapse cells (C) may include non-volatile memory (NVM) cells 108, and each NVM synapse cell 108 may include a transistor (T) and resistor (R) that are coupled in series. The synapse cells (C) may refer to programmable synapse cells for use in non-volatile memory (NVM) applications including at least one of resistive random access memory (RRAM) applications, magnetic RAM (MRAM) applications, spin-transfer-torque magnetic RAM (STT-MRAM) applications, and correlated-electron RAM (CeRAM) applications.

In various implementations, the synapse cells (C) may be disposed at neuronal junctions, e.g., where corresponding columns and rows intersect. The synapse cells (C) may be positioned in the array at crossbar intersection points of the columns and the rows, which may refer to neuronal junctions. The array may include passgates that are used to interconnect sub-blocks of synapse cells (C) within the array. For instance, NVM synapse cells 108 may have a transistor (T) that functions as a passgate for access to the resistive state of the NVM synapse cells 108 as stored by the resistor (R) in each cell.

In various implementations, non-volatile memories (NVM) such as, e.g., FeFET or Resistive-Switching (RS) technologies, including, e.g., RRAMs, ST-RAMs or CeRAM, are used for their applicability to store data in non-conventional processor architectures in various applications. Matrix-vector multiplications for base operations in dense-algebra applications (e.g., machine-learning (ML), hyper-dimensional computing or compressive sensing) may be deployed in RS crossbars that achieve impressive improvements in energy consumption and speed. However, RS technologies may be limited in the number of states they are programed in, which may limit precision. However, FIG. 1 represents an NVM crossbar having N×M RS devices interconnected as shown in the neural network circuitry 104. Also, depending on NVM technology, each NVM synapse cell may include a single NVM element or device that is accessible by a selector (e.g., either diode-based or transistor) that may refer to a 2-terminal cell, or a 3-4 terminal cell.

As shown in FIG. 2, the neural network circuitry 204 refers to neural network architecture having an array of synapse cells (C) arranged in columns and rows. In some implementations, the neural network circuitry 204 includes input circuitry 214 that provides voltage (V1, V2,3, V4) to the synapse cells (C) by way of row input lines (r1, r2, r3, r4) for the rows in the array. Also, the neural network circuitry 204 includes output circuitry 218 that receives current (I1, I2, I3, I4) from the synapse cells (C) by way of column output lines (c1, c2, c3, c4) for the columns in the array. Also, in various instances, conductance (G) for the synapse cells (C) in the array is determined based on the voltage (V1, V2, V3, V4) provided by the input circuitry 214 and the current (I1, I2, I3, I4) received by the output circuitry 218. Also, each synapse cell (C) has a corresponding conductance (G) that may be mapped based on parasitics associated with each synapse cell (C).

In some implementations, the input circuitry 214 may refer to digital-to-analog converter (DAC) circuitry, wherein each row (r1, r2, r3, r4) has its own corresponding DAC coupled thereto. The DAC circuitry may be configured to receive digital voltage signals (V1, V2, V3, V4) as input, convert the digital voltage signals to analog voltage signals, and then provide the analog voltage signals to the synapse cells (C) by way of the row input lines (r1, r2, r3, r4). In addition, the output circuitry 218 may refer to analog-to-digital (ADC) converter (DAC) circuitry, wherein each column (c1, c2, c3, c4) has its own corresponding ADC coupled thereto. Also, the ADC circuitry may be configured to receive analog current signals from the synapse cells by way of the column output lines (c1, c2, c3, c4), convert the analog current signals to digital current signals, and then provide the digital current signals as output. Also, in some instances, current (I) may be calculated based on voltage (V) multiplied by conductance (G), wherein I=V×G. Thus, based on this equation, conductance (G) for each synapse cell may be calculated as G=I/V, with voltage (V) as the inputs, current (I) as the outputs, and G as the mapped matrix.

In some implementations, the conductance (G) for the synapse cells (C) in the array is mapped based on positional orientation of each synapse cell (C) in the array. In some instances, the conductance of the synapse cells may include parasitic conductance based on the positional orientation of the synapse cells such that effective conductance is selectively tuned by adjusting a programmable weight of each synapse cell. For instance, as shown in FIG. 2, the first row (r1) of synapse cells (C) has corresponding conductances, such as, e.g., G11, G12, G13, G14, wherein added row parasitics 224 are applied to synapse cells (C) based on location across the row (r1) such that conductance G14 has the most added row parasitics 224. In some instances, added column parasitics 228 may be applied to synapse cells (C) based on location across the columns (c1, c2, c3, c4) such that conductance G14 has the most added column parasitics 228.

The second row (r2) of synapse cells (C) also has corresponding conductances, such as, e.g., G21, G22, G23, G24, wherein added row parasitics 224 are applied to synapse cells (C) based on location across the row (r2) such that conductance increases with added row parasitics 224. In some instances, added column parasitics 228 may be applied to synapse cells (C) based on location across the columns (c1, c2, c3, c4) such that conductance increases with added column parasitics 228.

The third row (r3) of synapse cells (C) also has corresponding conductances, such as, e.g., G31, G32, G33, G34, wherein added row parasitics 224 are applied to synapse cells (C) based on location across the row (r3) such that conductance increases with added row parasitics 224. In some instances, added column parasitics 228 may be applied to synapse cells (C) based on location across the columns (c1, c2, c3, c4) such that conductance increases with added column parasitics 228.

The fourth row (r4) of synapse cells (C) has corresponding conductances, such as, e.g., G41, G42, G43, G44, wherein added row parasitics 224 are applied to synapse cells (C) based on location across the row (r4) such that conductance G41 has the least added row parasitics 224. In some instances, added column parasitics 228 may also be applied to synapse cells (C) based on location across the columns (c1, c2, c3, c4) such that conductance G41 has the least added column parasitics 228.

Therefore, as shown in FIG. 2, the conductance (G) for the synapse cells (C) in the array may be mapped based on positional orientation of each synapse cell (C) in the array. Also, in some implementations, the conductance (G) for the synapse cells (C) in the array may be mapped at programming time based on positional orientation of each synapse cell (C) in the array.

In various implementations, each synapse cell (C) may have a programmable resistance value, and the conductance (G) for each synapse cell (C) may be calculated based on the programmable resistance value for each synapse cell (C). The conductance (G) for each synapse cell (C) may be mapped according to the programmable resistance value for each synapse cell (C). Also, the conductance (G) of the synapse cells (C) may include parasitic conductance based on the positional orientation of the synapse cells (C) in the array. Also, the parasitic conductance may be cumulative along row lengths of the row input lines (r1, r2, r3, r4) for the rows and along column lengths of the column output lines (c1, c2, c3, c4) for the columns between the input DAC circuitry 214 and the output (ADC) circuitry 218.

In various implementations, the parasitic conductance for the synapse cells (C) may be selectively modified by adjusting a resistance value associated with the synapse cells (C). Also, accumulation of the parasitic conductance may be selectively modified by adjusting resistance values associated with the synapse cells (C) along the row lengths of the row input lines (r1, r2, r3, r4) for the rows and the column lengths of the column output lines (c1, c2, c3, c4) for the columns between the input DAC circuitry 214 and the output ADC circuitry 218. Also, the conductance (G) of the synapse cells (C) may include parasitic conductance based on one or more characteristics associated with the synapse cells (C) including one or more of positional orientation, conductance drift, temperature and input amplitudes of the synapse cells.

In various implementations, in reference to FIGS. 1-2, positional orientation of the synapse cells (C) may be defined by points of intersection for the rows (r1, r2, r3, r4) and columns (c1, c2, c3, c4) in the array. Also, the conductance (G) for the synapse cells (C) may be mapped in a manner so as to correspond to the points of intersection for the rows (r1, r2, r3, r4) and columns (c1, c2, c3, c4) in the array. Also, in various instances, the points of intersection may refer to resistive-switching (RS) crossbars, and positional orientation of the synapse cells (C) may refer to the location of the synapse cells (C) in the array at the RS crossbars.

Figure 3:
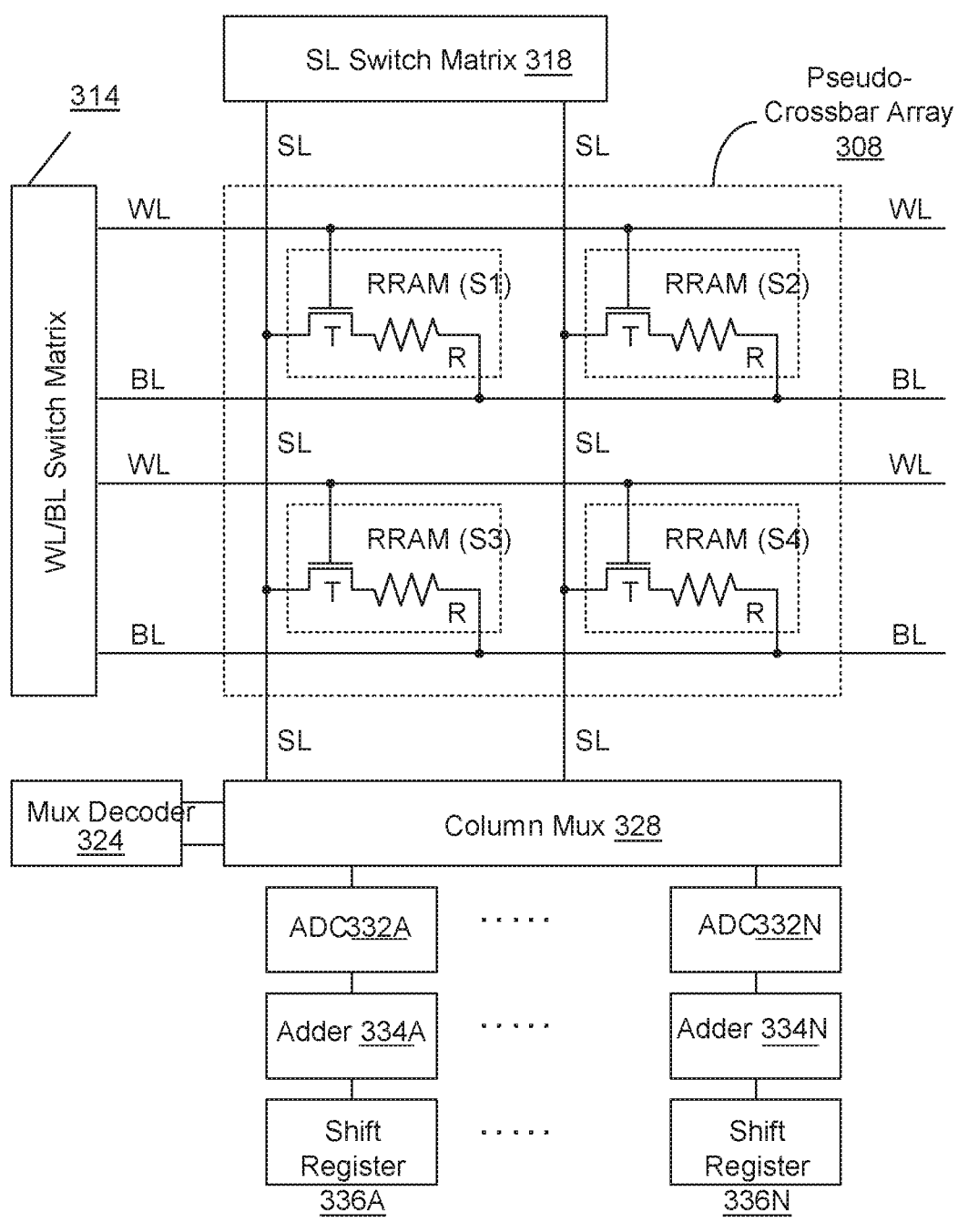
FIGS. 3-4 illustrate various diagrams of neural network circuitry with synapse cells in accordance with various implementations described herein.
Figure 4:
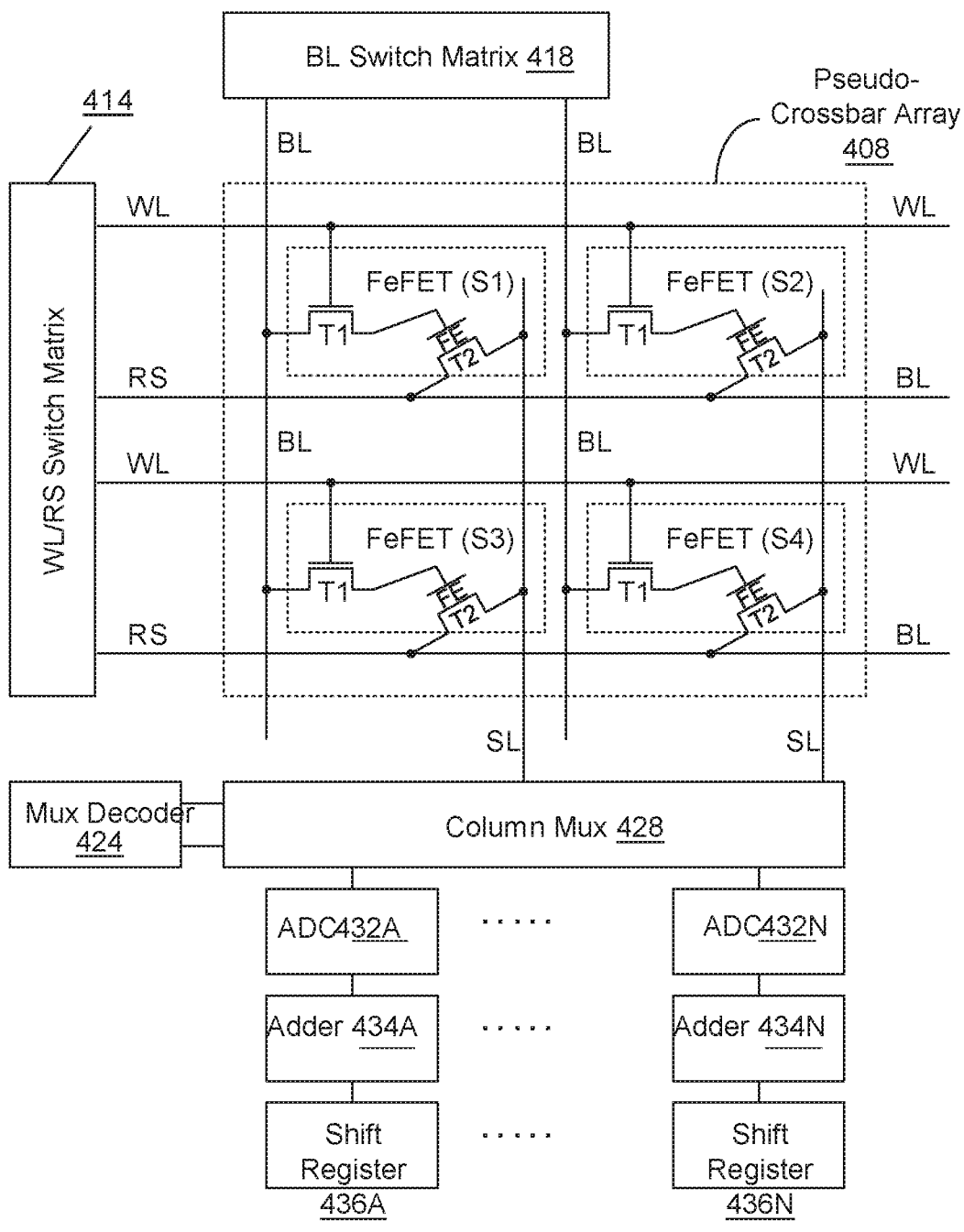

FIGS. 3-4 illustrate various diagrams of neural network circuitry with synapse cells in accordance with implementations described herein. In particular, FIG. 3 shows a diagram 300 of a neural network 304 with 2-terminal NVM synapse cells, and FIG. 4 shows a diagram 400 of a neural network 404 with 3-terminal NVM synapse cells.

As shown in FIG. 3, the neural network 304 may include a pseudo-crossbar array 308 with 2-terminal NVM synapse cells, including, e.g., RRAM synapse cells having a transistor (T) and a resistor (R) coupled together to form NVM synapse cells. The neural network 304 may have a wordline/bitline (WL/BL) switch matrix 314 coupled to the RRAM synapse cells (S1, S2, S3, S4) via wordlines (WL) and bitlines (BL). The neural network 304 may have a source line (SL) switch matrix 318 coupled to the RRAM synapse cells (S1, S2, S3, S4) via source lines (SL). Also, in some instances, the wordlines (WL) may be coupled to corresponding gates of transistors (T) in the synapse cells (S1, S2, S3, S4), and the transistors (T) and resistors (R) in the synapse cells (S1, S2, S3, S4) are coupled in series between corresponding source lines (SL) and bitlines (BL).

Also, in some implementations, the neural network 304 may include a column multiplexer (column mux) 328 coupled to the pseudo-crossbar array 308 via the source lines (SL), and the neural network 304 may include a mux decoder 324 coupled to the column mux 328. Moreover, the neural network 304 may include a number (N) of ADC converters (332A, . . . , 332N), adders (334A, . . . , 334N) and shift registers (336A, . . . , 336N) that are coupled in the column mux 328 in column groups.

As shown in FIG. 4, the neural network 404 may include a pseudo-crossbar array 408 with 3-terminal NVM synapse cells, e.g., ferroelectric field-effect transistor (Fe FET) synapse cells having a transistor (T1) and a FeFET transistor (T2) coupled together to form NVM synapse cells in the array 408. Also, the neural network 404 may include a wordline/resistive switching line (WL/RS) switch matrix 414 coupled to FeFET synapse cells (S1, S2, S3, S4) via wordlines (WL) and resistive switching lines (RS). The neural network 404 may include a bitline (BL) switch matrix 418 coupled to FeFET synapse cells (S1, S2, S3, S4) via bitlines (BL). In some instances, the wordlines (WL) may be coupled to corresponding gates of transistors (T1) in the synapse cells (S1, S2, S3, S4), and the transistors (T1) in the synapse cells (S1, S2, S3, S4) may be coupled in series between corresponding bitlines (BL) and gates of FeFETs (T2). Also, in some instances, FeFETs (T2) may be coupled between resistive switching lines (RS) and source lines (SL) for each synapse cell (S1, S2, S3, S4) in the array 408.

Also, in some implementations, the neural network 404 may include a column multiplexer (column mux) 428 coupled to the pseudo-crossbar array 408 via the source lines (SL), and the neural network 404 may include a mux decoder 424 coupled to the column mux 428. Moreover, the neural network 404 may include a number (N) of ADC converters (432A, . . . , 432N), adders (434A, . . . , 434N) and shift registers (436A, . . . , 436N) that are coupled in the column mux 428 in column groups.

Figure 5:
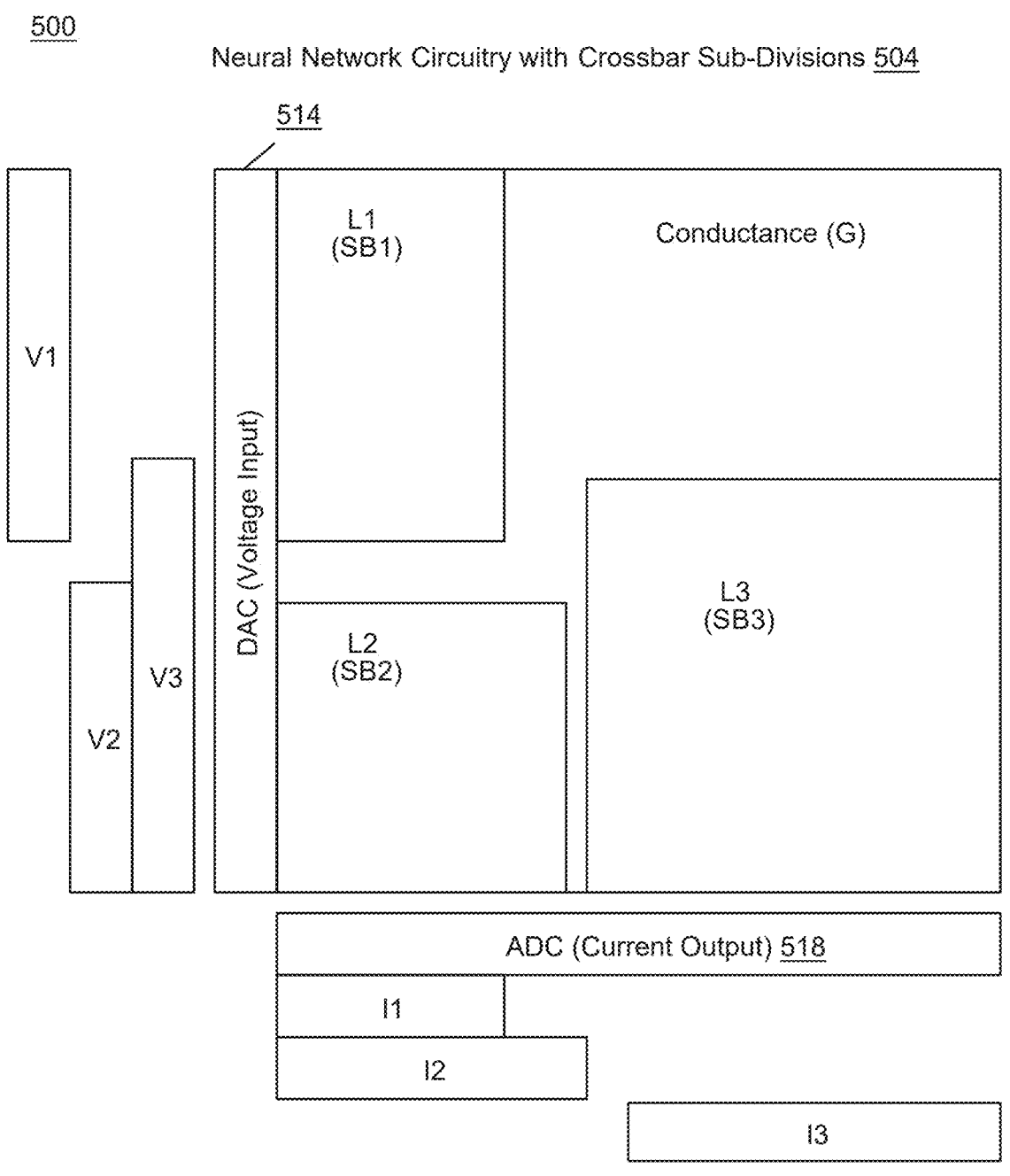
FIGS. 5-8 illustrate various diagrams of neural network circuitry with crossbar sub-divisions in accordance with implementations described herein.
Figure 6:
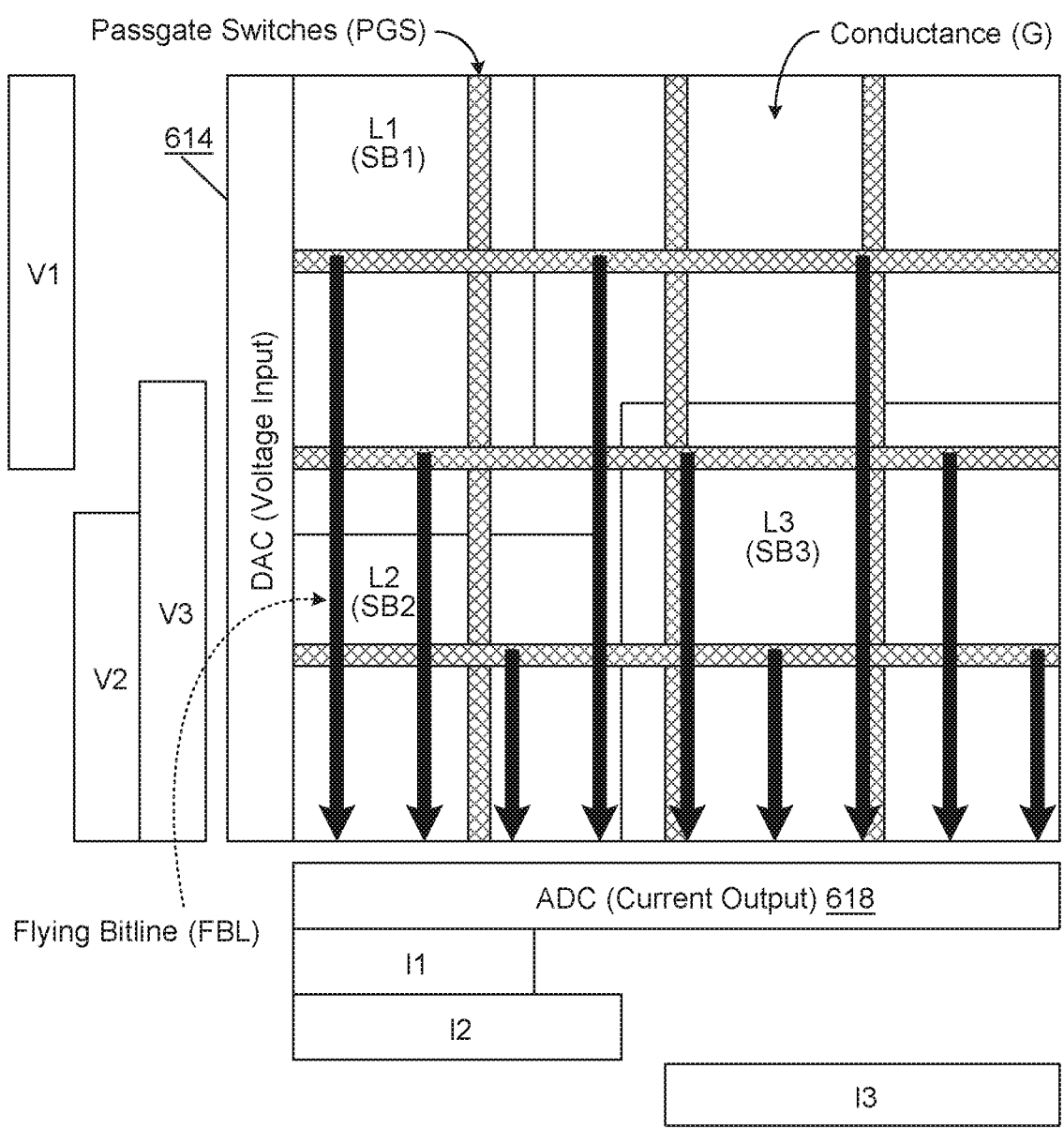
Figure 7:
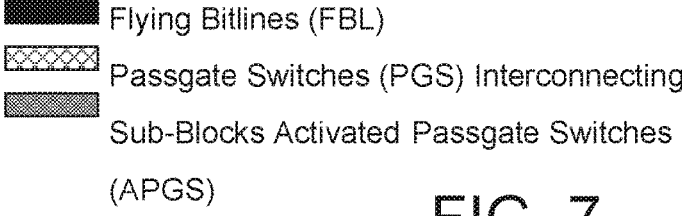
Figure 8:
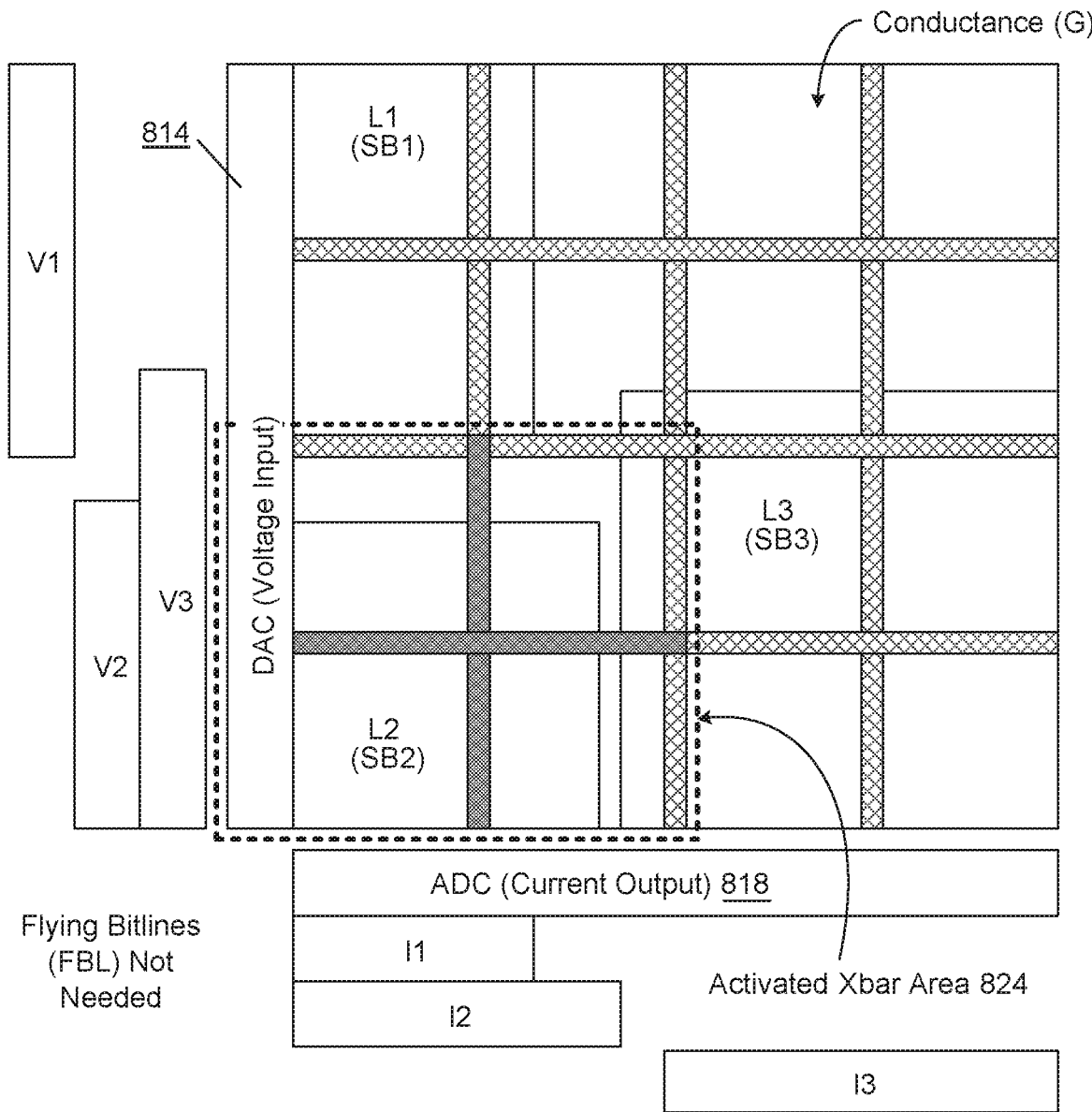

FIGS. 5-8 illustrate various diagrams of neural network circuitry with crossbar sub-divisions in accordance with various implementations described herein. In particular, FIG. 5 shows a diagram 500 of neural network circuitry 504 with crossbar sub-divisions, FIG. 6 shows another diagram 600 of neural network circuitry 604 with crossbar sub-divisions and flying bitlines (FBL), FIG. 7 shows another diagram 700 of neural network circuitry 704 with crossbar sub-divisions and flying bitlines (FBL), and also, FIG. 8 shows another diagram 800 of neural network circuitry 804 with crossbar sub-divisions and flying bitlines (FBL). Also, FIGS. 6-8 show passgates switches for interconnecting sub-blocks (or sub-divisions), and FIGS. 7-8 show activated passgate switches.

As shown in FIG. 5, the neural network circuitry 504 may have crossbar sub-divisions or sub-block layers (L1/SB1, L2/SB2, L3/SB3) and conductance layer (G). Also, the neural network circuitry 504 may have DAC circuitry 514 for input of voltages (V1, V2, V3), and the neural network circuitry 504 may have ADC circuitry 518 for output of current (I1, I2, I3). In some instances, the neural network circuitry 604 may include an array with synapse cells arranged in at intersections points of columns and rows.

As shown in FIG. 6, the neural network circuitry 604 may have crossbar sub-divisions or sub-block layers (L1/SB1, L2/SB2, L3/SB3) and conductance layer (G). Also, the neural network circuitry 604 may have DAC circuitry 614 for input of voltages (V1, V2, V3), and the neural network circuitry 604 may have ADC circuitry 618 for output of current (I1, I2, I3). In some instances, the neural network circuitry 604 may include an array with flying bitlines (FBL) that are used to couple the sub-blocks (L1/SB1, L2/SB2, L3/SB3) to the output ADC circuitry 618 so as to receive current (I1, I2, I3) from the synapse cells in the array by way of the column output lines for the columns in the array. Also, the neural network circuitry 604 may include passgate switches (PGS) that are used to interconnect the sub-blocks (L1/SB1, L2/SB2, L3/SB3) of the synapse cells within the array.

As shown in FIG. 7, the neural network circuitry 704 may have crossbar sub-divisions or sub-block layers (L1/SB1, L2/SB2, L3/SB3) and conductance layer (G). Also, the neural network circuitry 704 may have DAC circuitry 714 for input of voltages (V1, V2, V3), and the neural network circuitry 704 may have ADC circuitry 718 for output of current (I1, I2, I3). In some instances, the neural network circuitry 704 may include an array with flying bitlines (FBL) that are used to couple the sub-blocks (L1/SB1, L2/SB2, L3/SB3) to the output ADC circuitry 718 so as to receive current (I1, I2, I3) from the synapse cells in the array by way of the column output lines for the columns in the array. Also, the neural network circuitry 704 may include passgate switches (PGS) that are used to interconnect the sub-blocks (L1/SB1, L2/SB2, L3/SB3) of the synapse cells within the array. Also, the neural network circuitry 704 may include an activated crossbar area 724 that is activated with activated passgate switches (APGS) via the flying bitlines (FBL).

As shown in FIG. 8, the neural network circuitry 804 may have crossbar sub-divisions or sub-block layers (L1/SB1, L2/SB2, L3/SB3) and conductance layer (G). Also, the neural network circuitry 804 may have DAC circuitry 814 for input of voltages (V1, V2, V3), and the neural network circuitry 804 may have ADC circuitry 818 for output of current (I1, I2, I3). In some instances, the neural network circuitry 804 may include an array with flying bitlines (FBL) that are used to couple the sub-blocks (L1/SB1, L2/SB2, L3/SB3) to the output ADC circuitry 818 so as to receive current (I1, I2, I3) from the synapse cells in the array by way of the column output lines for the columns in the array. Also, the neural network circuitry 804 may include passgate switches (PGS) that are used to interconnect the sub-blocks (L1/SB1, L2/SB2, L3/SB3) of the synapse cells within the array. Also, the neural network circuitry 804 may include an activated crossbar area 824 that is activated with activated passgate switches (APGS). In this instance, the flying bit-lines (FBL) may not be needed to couple the activated crossbar area 824 to the ADC 818.

Various implementations described herein refer to neural network circuitry and post/during training weight techniques that apply various conductance mapping methods to parasitic alleviation on analog MAC (multiplication-accumulation) accelerators. Various schemes and techniques described herein may be configured to deploy high-precision matrix-vector multiplication in switching-resistor based crossbars whose devices may only be low-precision programmed and avoid higher precision ADCs and intermediate large buffers. Moreover, these techniques allow systems based on dense-algebra operations (e.g., machine learning) to be ported to more power efficient analog crossbars that may be limited by device precision and system-noise levels, and that may also need higher precision ADCs with consequent overhead in area and power consumption.

Figure 9:
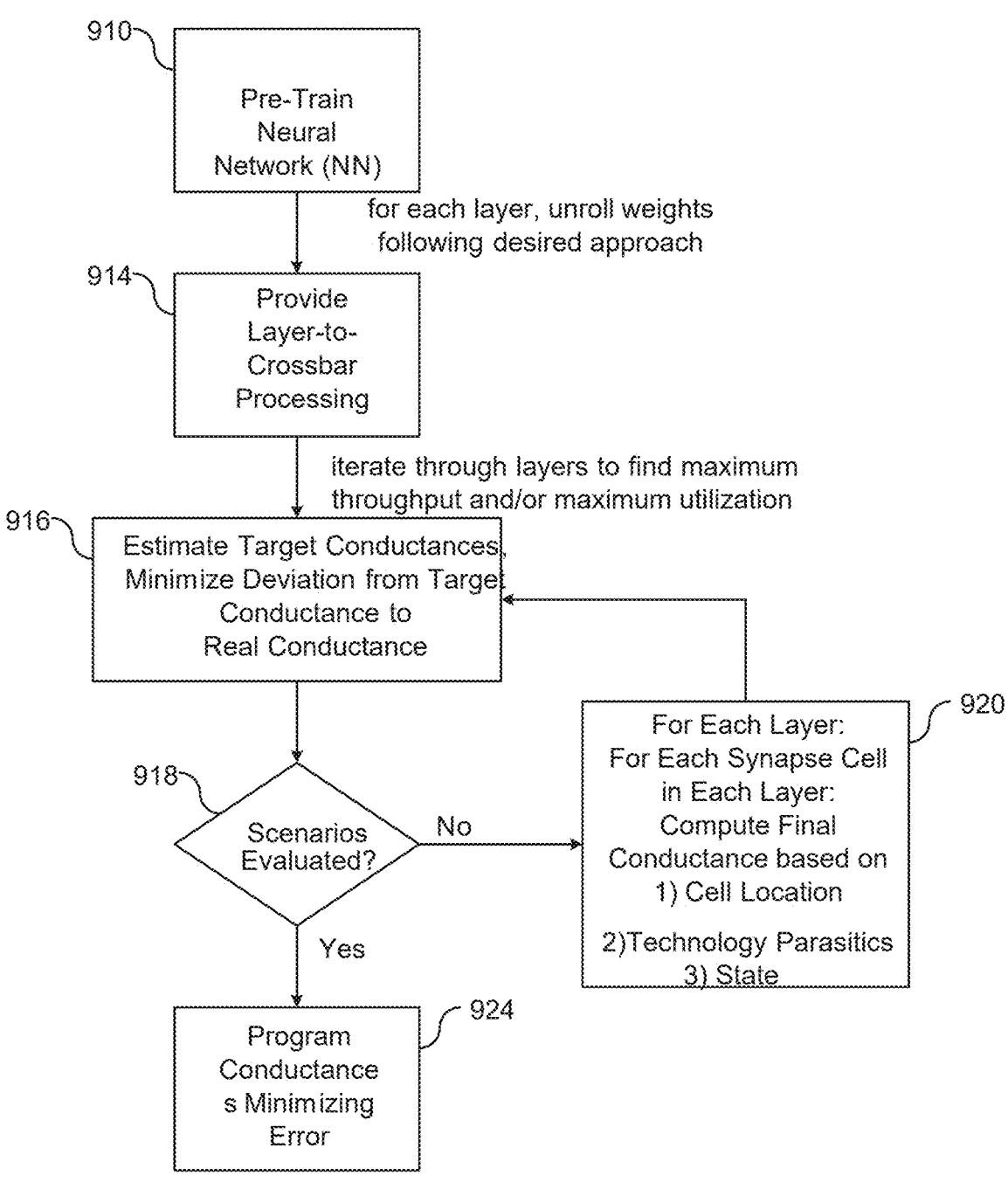
FIG. 9 illustrates a diagram of a method for mapping conductance for a neural network in accordance with implementations described herein.

FIG. 9 illustrates a diagram of a method 900 for mapping conductance of a neural network in accordance with various implementations described herein. In various implementations, the method 900 refers to a target conductance estimation technique for neural networks in accordance with various implementations described herein.

It should be understood that even though method 900 may indicate a particular order of operation execution, in some cases, various portions of the operations may be executed in a different order, and on different systems. In other cases, other operations and/or steps may be added to and/or omitted from method 900. Also, method 900 may be implemented in hardware and/or software. If implemented in hardware, method 900 may be implemented with components and/or circuitry, as described herein in reference to FIGS. 1-8. Also, if implemented in software, method 900 may be implemented as a program and/or software instruction process configured for estimating target conductance in various schemes and techniques described herein. Also, if implemented in software, instructions related to implementing method 900 may be recorded in memory and/or a database. For instance, various types of computing devices having at least one processor and memory may be configured to perform method 900.

In various implementations, method 900 may provide for a method of designing, building, fabricating and/or manufacturing neural network architecture as an integrated system, device and/or circuitry that involves use of various circuit components described herein so as to implement various neural networking schemes and techniques associated therewith. In some implementations, neural network architecture may be integrated with computing circuitry and related components on a single chip, and also, the neural network architecture may be implemented in various embedded chip-level systems for various electronic, mobile and Internet-of-things (IoT) applications.

At block 910, method 900 may be configured to pre-train the neural network (NN). For each layer in a multi-layered neural network structure, method 900 may unroll weights following a desired (or predetermined) approach, such as, e.g., by following a weight-to-conductance technique. In some instances, method 900 may provide neural network circuitry with multiple layers such that each layer has synapse cells arranged in an array. Also, for each layer in the neural network circuitry, method 900 may unroll weights of each layer by following a pre-determined approach.

At block 914, method 900 may be configured to provide for a layer-to-crossbar process. In some instances, method 900 may iterate through the layers in a multi-layered neural network structure so as to find (or determine and/or identify) a maximum throughput and/or a maximum utilization. In various instances, method 900 may iterate through the layers so as to find (or determine and/or identify) at least one of an upper boundary for throughput and an upper boundary for utilization.

At block 916, method 900 may estimate target conductances so as to minimize deviation from the target conductance to real conductance. In various instances, method 900 may estimate target conductances and then find (or determine and/or identify) a lower boundary for deviation from the target conductance and the real conductance.

At decision block 918, method 900 may be configured to evaluate one or more or all related scenarios. If yes, at block 924, method 900 may program conductances for each synapse cell in each layer so as to minimize errors in the neural network. Otherwise, if no, at block 920, method 900 may be configured to compute final conductance for each layer and/or each synapse cell in each layer based on synapse cell location, technology parasitics and/or state. In some instances, for each layer in the neural network, and for each synapse cell in each layer in the neural network, method 900 may be configured to compute a final conductance (or final target conductance) based one or more of synapse cell location, technology parasitics, and state. Also, in some instances, method 900 may program the target conductances so as to reduce error related to conductance.

Figure 10B:
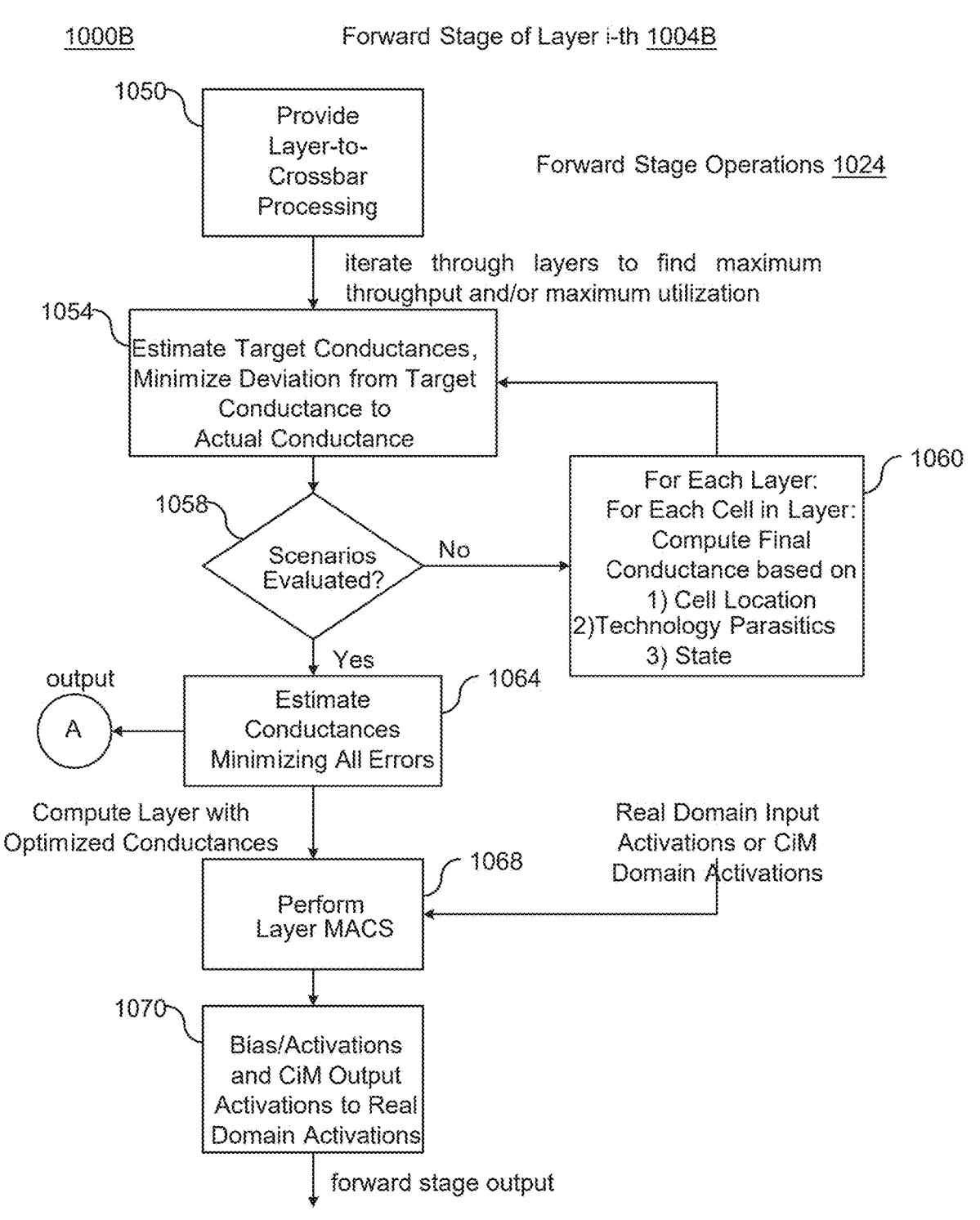

FIGS. 10A-10B illustrate process diagrams of methods for providing training operations for a neural network in accordance with implementations described herein. In particular, FIG. 10A shows a method 1000A for providing a training operation for neural networks using forward/backward stages 1004, including, e.g., a backward stage 1004A and a forward stage 1004B, and also, FIG. 10B shows a method 1000B for providing the forward stage 1004B of an i-th layer 1004B in the neural network.

It should be understood that even though methods 1000A, 1000B may indicate a particular order of operation execution, in some cases, various portions of the operations may be executed in a different order, and on different systems. In other cases, operations and/or steps may be added to and/or omitted from methods 1000A, 1000B. Also, methods 1000A, 1000B may be implemented in hardware or software. If implemented in hardware, methods 1000A, 1000B may be implemented with various components and circuitry, as described herein in reference to FIGS. 1-9. Also, if implemented in software, methods 1000A, 1000B may be implemented as a program and/or software instruction process that is configured for training neural networks in various schemes and techniques described herein. Further, if implemented in software, instructions related to implementing methods 1000A, 1000B may be recorded in memory and/or a database. For instance, some types of computing devices having at least one processor and memory may be configured to perform methods 1000A, 1000B shown in FIGS. 10A-10B.

In various implementations, methods 1000A, 1000B may provide for a method of designing, building, fabricating and/or manufacturing neural network architecture as an integrated system, device and/or circuitry that involves use of various circuit components described herein so as to implement various neural networking schemes and techniques associated therewith. In various implementations, some neural network architecture may be integrated with computing circuitry and related components on a single chip, and also, neural network architecture may be implemented in various embedded chip-level systems for various electronic, mobile and Internet-of-things (IoT) applications.

As shown in FIG. 10A, method 1000A provides a training operation for neural networks using forward/backward stages 1004, including, e.g., the backward stage 1004A and the forward stage 1004B. In some instances, the backward stage 1004A may include one or more backward stage operations 1014, 1018 of an i-th layer in a neural network, and further, the forward stage 1004B may include one or more forward stage operations 1024 of an i-th layer in a neural network.

In some instances, method 1000A may provide the neural network with multiple layers such that each layer has synapse cells arranged in an array. Also, method 1000A may perform the backward stage 1004A on the neural network, and method 1000A may perform the forward stage 1004B on the neural network.

At block 1014, method 1000A may perform the backward stage as per defined by the layer algorithm. In some instances, the backward stage may be performed without using the quantized weights, and the backward stage may be performed without using the conductance minimization error.

At block 1018, if a neural architecture search (NAS) is used so as to alter layer characteristics (filter size, pruning, etc.) of the multiple layers, then method 1000A may include information from a CiM structure (i.e., Compute-in-Memory including information related to area, number of operations, power consumed, throughput, etc.) into the neural network, and information related to parasitics for each synapse cell in each layer may be used during layer-to-crossbar mapping so as to reduce the effect of the parasitics on the neural network. In some instances, Compute-in-Memory (CiM) may refer to process-in-Memory (PiM). Also, in some instances, if NAS is used to alter layer characteristics of the multiple layers, then weight training may be used to reduce the effect of parasitics on the neural network by including information from an equivalent CiM structure into the neural network. Therefore, in some instances, a weight training method may lead to a reduction of an effect of parasitics on the neural network by including information from an equivalent CiM structure into the neural network.

In some implementations, information related to parasitics may be used during layer-to-crossbar mapping to minimize parasitics. Also, if the parasitics degrade accuracy over a threshold, then each layer may be split so that the dynamic range is non-degraded with a corresponding reduction of throughput.

In some implementations, the forward stage 1004B may provide an output (A) to block 1018. For instance, the forward stage 1004B may estimate target conductances so as to reduce the effect of errors by finding a lower boundary for deviation from a target conductance and a real conductance. Thus, in some instances, the output (A) may refer to the forward stage 1004B providing the estimated target conductances to the backward stage 1004A via the output (A) so that the backward stage 1004A is performed based on the target conductances, as provided by the forward stage 1004B.

As shown in FIG. 10B, method 1000B may provide the forward stage 1004B of an i-th layer 1004B in the neural network. In some implementations, the forward stage 1000B is configured to perform the forward stage operations 1024, and also, the forward stage 1004B is configured to provide the output (A) from block 1064.

At block 1050, method 1000B may be configured to provide layer-to-crossbar processing for the neural network. In some instances, method 1000B may iterate through the layers in the multi-layered neural network structure so as to find (or determine and/or identify) maximum throughput and/or maximum utilization. In various instances, method 1000B may iterate through the layers so as to find (or determine and/or identify) at least one of an upper boundary for throughput and an upper boundary for utilization.

At block 1054, method 1000B estimates target conductances so as to minimize deviation from the target conductance to real conductance. In various instances, method 1000B may estimate target conductances and so as to find (or determine and/or identify) a lower boundary for deviation from target conductance and real conductance.

At decision block 1058, method 1000B may be configured to evaluate one or more related scenarios. If yes, at block 1064, method 1000B estimate conductances for each synapse cell in each layer so as to minimize errors in the neural network. Also, from block 1064, the method 1000B may use the forward stage 1004B to provide output (A) to block 1018 in FIG. 10A. For instance, the forward stage 1004B may estimate the target conductances so as to reduce the effect of errors by finding a lower boundary for deviation from a target conductance and a real conductance. Thus, in some instances, the output (A) may refer to the forward stage 1004B providing the estimated target conductances to backward stage 1004A via the output (A) so that the backward stage 1004A is performed based on the target conductances, as provided by the forward stage 1004B.

Otherwise, if no, at block 1060, method 1000B may be configured to compute final conductance for each layer and/or each synapse cell in each layer based on synapse cell location, technology parasitics and/or state. Also, for each layer in the neural network, and for each synapse cell in each layer in the neural network, method 1000B is configured to compute final conductance (or final target conductance) based one or more of synapse cell location, technology parasitics, and state. Also, method 1000B may program target conductances so as to reduce error related to conductance.

In some implementations, at block 1064, method 1000B may compute one or more layers with optimized conductances and then provide this information to block 1068, wherein at block 1068, method 1000B performs layer MACS based on real domain input activations or CiM domain activations. Next, at block 1070, method 1000B may compute bias/activations and CiM output activations to real domain activations. Also, from block 1070, method 1000B may provide the forward stage output based on bias/activations and CiM output activations to real domain activations.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device with neural network circuitry. The neural network circuitry may include an array of synapse cells arranged in columns and rows. The device may include input circuitry that provides voltage to the synapse cells by way of row input lines for the rows in the array. The device may include output circuitry that receives current from the synapse cells by way of column output lines for the columns in the array. Also, conductance for the synapse cells in the array may be determined based on the voltage provided by the input circuitry and the current received by the output circuitry.

Described herein are various implementations of a method. The method may provide a neural network with multiple layers such that each layer has synapse cells arranged in an array. For each layer in the neural network, the method may unroll weights of the layers following a pre-determined approach. The method may iterate through the layers to find at least one of an upper boundary for throughput and an upper boundary for utilization. The method may estimate target conductances and finding a lower boundary for deviation from a target conductance and a real conductance.

Described herein are various implementations of a method. The method may provide a neural network with multiple layers such that each layer has synapse cells arranged in an array. The method may perform a backward stage on the neural network, and the method may also perform a forward stage on the neural network. If a neural architecture search (NAS) is used to alter layer characteristics of the multiple layers, then the method may use weight training to provide a reduction of an effect of parasitics on the neural network by including information from a compute-in-memory (CiM) structure into the neural network.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
neural network circuitry having an array of synapse cells that are arranged in columns and rows;
input circuitry that provides voltage to the synapse cells by way of row input lines for the rows in the array; and
output circuitry that receives current from the synapse cells by way of column output lines for the columns in the array,
wherein conductance for the synapse cells in the array is determined based on the voltage provided by the input circuitry and the current received by the output circuitry,
wherein the conductance for the synapse cells in the array is mapped based on positional orientation of each synapse cell in the array, and
wherein the array is subdivided into sub-blocks, the sub-blocks being selectively interconnected by pass-gates coupled to the output circuitry by flying bitlines.

2. The device of claim 1, wherein:
the conductance for the synapse cells in the array is mapped at programming time based on positional orientation of each synapse cell in the array.

3. The device of claim 1, wherein:
each synapse cell has a programmable resistance value, and
the conductance for each synapse cell is calculated and mapped based on the programmable resistance value for each synapse cell.

4. The device of claim 1, wherein:
the conductance of the synapse cells includes parasitic conductance based on the positional orientation of the synapse cells such that the conductance is selectively tuned by adjusting a programmable weight of each synapse cell, and
the parasitic conductance is cumulative along row lengths of the row input lines for the rows and along column lengths of the column output lines for the columns between the input circuitry and the output circuitry.

5. The device of claim 4, wherein:
the parasitic conductance for the synapse cells is selectively modified by adjusting a resistance value associated with the synapse cells, and
accumulation of the parasitic conductance is selectively modified by adjusting the resistance values associated with the synapse cells along the row lengths of the row input lines for the rows and the column lengths of the column output lines for the columns between the input circuitry and the output circuitry.

6. The device of claim 1, wherein:
the conductance of the synapse cells includes parasitic conductance based on one or more characteristics of the synapse cells including positional orientation, conductance drift, temperature and input amplitudes of the synapse cells.

7. The device of claim 1, wherein:
the synapse cells are positioned in the array at crossbar intersection points of the columns and the rows.

8. The device of claim 7, wherein:
the flying bitlines are used to couple the sub-blocks to the output circuitry so as to receive current from the synapse cells by way of the column output lines for the columns in the array.

9. The device of claim 1, wherein:
the synapse cells are programmable synapse cells for use in non-volatile memory (NVM) applications including at least one of resistive random access memory (RRAM) applications, magnetic random access memory (MRAM), and correlated-electron random access memory (CeRAM).

10. The device of claim 1, wherein:
the positional orientation of the synapse cells is defined by points of intersection for the rows and columns in the array, and
the conductance for the synapse cells is mapped corresponding to the points of intersection for the rows and columns in the array.

11. The device of claim 10, wherein:
the points of intersection refer to resistive-switching (RS) crossbars, and
the positional orientation of the synapse cells refers to the location of the synapse cells in the array at the RS crossbars.

12. The device of claim 1, wherein:
the input circuitry comprises digital-to-analog conversion (DAC) circuitry, and
the DAC circuitry is configured to receive digital voltage signals as input, convert the digital voltage signals to analog voltage signals, and then provide the analog voltage signals to the synapse cells by way of the row input lines.

13. The device of claim 1, wherein:
the output circuitry comprises analog-to-digital conversion (ADC) circuitry, and
the ADC circuitry is configured to receive analog current signals from the synapse cells by way of the column output lines, convert the analog current signals to digital current signals, and then provide the digital current signals as output.

14. A method comprising:
providing a neural network with multiple layers such that each layer has synapse cells arranged in an array;
for each layer in the neural network, unrolling weights of the layers following a pre-determined approach, wherein the unrolling comprises converting weight values to conductance values using digital-to-analog converter (DAC) circuitry and measuring the conductance values using analog-to-digital converter (ADC) circuitry;
iterating through the layers to find at least one of an upper boundary for throughput and an upper boundary for utilization for the synapse cells of each layer of the neural network, the upper boundary for throughput and the upper boundary for utilization for the synapse cells of each layer of the neural network being determined by selectively activating sub-blocks of the array via passgates and flying bitlines; and estimating target conductances and finding a lower boundary for deviation from a target conductance and a real conductance for the synapse cells of each layer of the neural network, wherein the real conductance for the synapse cells of each layer of the neural network includes contributions from position-dependent parasitic effects.

15. The method of claim 14, further comprising:

for each layer in the neural network, and for each synapse cell in each layer, compute a final conductance based one or more of synapse cell location, technology parasitics, and state; and program the target conductances so as to reduce error.

16. The method of claim 14, wherein the predetermined approach refers to a weight-to-conductance technique.

17. A method comprising:

providing a neural network with multiple layers such that each layer has synapse cells arranged in an array;

performing a backward stage on the neural network;

performing a forward stage on the neural network; and if a neural architecture search (NAS) is used to alter layer characteristics of the multiple layers, then weight training is used to provide a reduction of an effect of parasitics on the neural network by including information from a compute-in-memory structure into the neural network.

18. The method of claim 17, further comprising:

if the parasitics degrade accuracy over a threshold, then each layer is split so that a dynamic range of conductances for the synapse cells in each layer is maintained without degradation even when throughput of the neural network is reduced, wherein information related to parasitics for each synapse cell in each layer is used during layer-to-crossbar mapping so as to reduce the effect of the parasitics on the neural network.

19. The method of claim 17, further comprising:

estimating target conductances and reducing the effect of errors by finding a lower boundary for deviation from a target conductance and a real conductance; and providing the estimated target conductances to the backward stage so that the backward stage is performed based on the target conductances.

\*   \*   \*   \*   \*